United States Patent [19]

Tamamura et al.

[11] Patent Number: 5,097,278
[45] Date of Patent: Mar. 17, 1992

[54] CAMERA USING A FILM WITH A MAGNETIC MEMORY

[75] Inventors: Hideo Tamamura, Yokohama; Chikara Aoshima, Zama, both of Japan

[73] Assignee: Canon Kabushiki Kaisha, Tokyo, Japan

[21] Appl. No.: 669,644

[22] Filed: Mar. 14, 1991

[30] Foreign Application Priority Data
Mar. 15, 1990 [JP] Japan ................................ 2-62513
Jul. 24, 1990 [JP] Japan ................................ 2-195544

[51] Int. Cl.⁵ ...................... G03B 17/00; G03B 17/24
[52] U.S. Cl. ..................................... 354/105; 354/203
[58] Field of Search ...................... 354/105, 106, 203

[56] References Cited
U.S. PATENT DOCUMENTS
5,005,031 4/1991 Kelbe ................................ 354/106

Primary Examiner—Michael L. Gellner
Attorney, Agent, or Firm—Fitzpatrick, Cella, Harper & Scinto

[57] ABSTRACT

A camera using a film with a magnetic memory has a magnetic head for writing information to or reading information from the magnetic memory of the film, a pressure plate for holding the magnetic head, and a notch generally formed in the pressure plate at an area where the pressure plate holds the magnetic head.

16 Claims, 5 Drawing Sheets

CAMERA USING A FILM WITH A MAGNETIC MEMORY

BACKGROUND OF THE INVENTION

1. Field of the Invention

The present invention relates to an improvement over a camera using a film having a magnetic memory and having a magnetic head for writing information to and reading information from the film having the magnetic memory, such as photographing information including shutter speed and aperture value.

2. Related Background Art

A camera which uses a film having a magnetic memory and has a magnetic head to write to the magnetic memory the photographing information such as shutter speed, aperture value, data or title and read the information as required has been proposed in, for example, U.S. Pat. No. 4,864,332 and U.S. Pat. No. 4,972,213.

Figure 12:
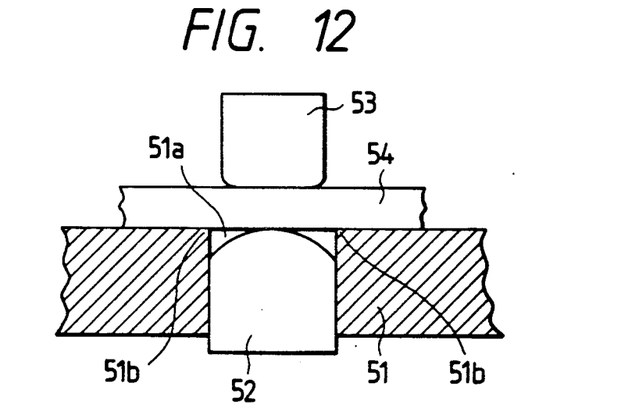
FIG. 12 shows a sectional view illustrating a relationship between a pressure plate and a magnetic head in a camera of this type.

However, in such a camera, as shown in FIG. 12, when the magnetic head 52 is fixed to a pressure plate 51 to write or read the information to or from the film 54, the film 54 may be caught by edges 51b and 51c of an aperture 51a of the pressure plate 51 so that the film 54 is damaged.

SUMMARY OF THE INVENTION

In light of the above, it is an object of the present invention to provide a camera using a film with a magnetic memory which comprises a magnetic head for writing information to or reading information from the magnetic memory of the film, a pressure plate for holding the magnetic head and a notch gently formed in the pressure plate at an area where the pressure plate holds the magnetic head wherein the catching of the film by peripheral edges of the notch, the damaging of the film and the increase of the feed load of the film are prevented.

It is another object of the present invention to provide a camera using a film with a magnetic memory wherein the above notch is formed by a linear groove so that the film is deformed along the groove without resistance when the pressure plate is abutted.

Other objects of the present invention will be apparent from the following description of the preferred embodiments.

DETAILED DESCRIPTION OF THE PREFERRED EMBODIMENTS

Figure 1:
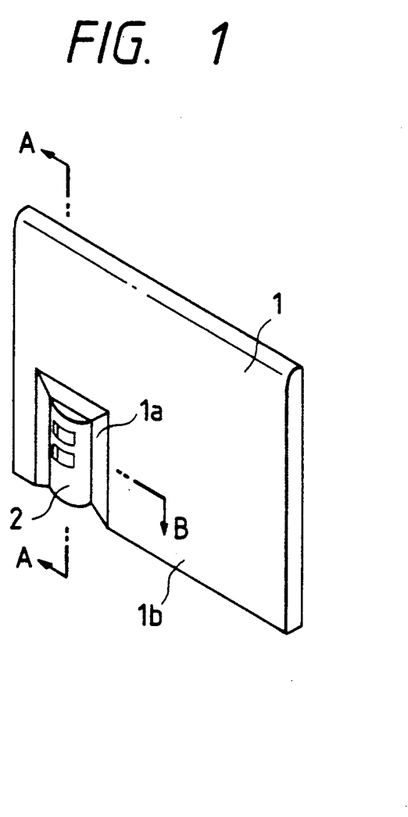
FIG. 1 shows a perspective view of a pressure plate and a magnetic head in a first embodiment of the present invention.
Figure 2:
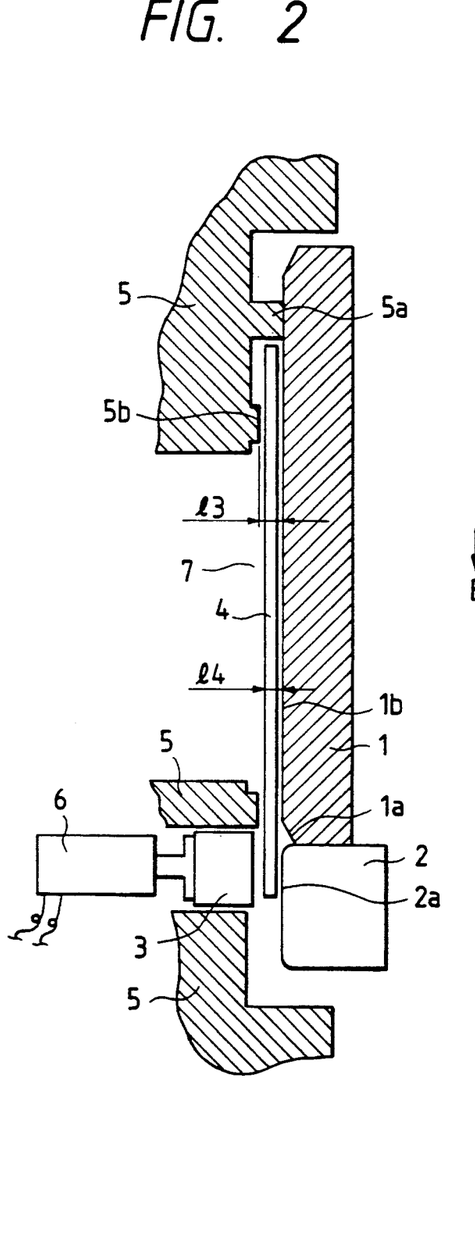
FIG. 2 shows a sectional view of a major portion of a camera including a sectional view taken along a line A—A of FIG. 1, FIGS. 3 and 4 show sectional views of major portions of the camera, including a sectional view taken along a line B—B of FIG. 1.
Figure 3:
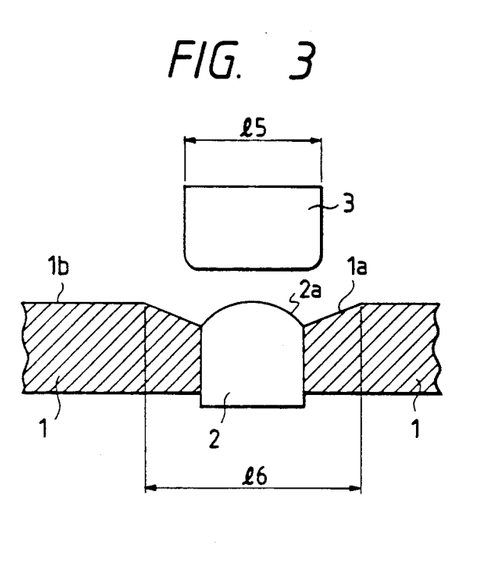
Figure 4:
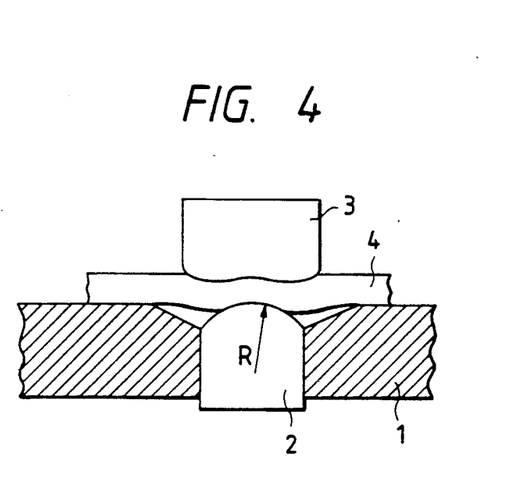

FIGS. 1 to 4 show a first embodiment of the present invention, in which FIG. 1 is a perspective view of a pressure plate and a magnetic head, FIG. 2 is a sectional view of a camera including a sectional view taken along a line A—A of FIG. 1, FIG. 3 and FIG. 4 are sectional views of the camera including a sectional view taken along a line B—B of FIG. 1.

In those figures, numeral 1 denotes a pressure plate which serves as regulation means for positioning a film along an optical axis for an aperture and maintaining planarity of the film, numeral 2 denotes a magnetic head for writing information to or reading information from a magnetic memory of the film, numeral 3 denotes a pad which serves as an urging member to urge the magnetic memory of the film 4 to the magnetic head 2, numeral 5 denotes a camera body, numeral 6 denotes a pad driving plunger and numeral 7 denotes an aperture.

The magnetic head 2 is fixed to the pressure plate 1 in such a manner that a film contact plane 2a of the head 2 and a film contact plane 1b of the pressure plate 1 are coplanar, and the pressure plate 1 has bevelings 1a which form a gentle notch to the pressure plate 1. The pressure plate 1 contacts an outer rail 5a of the camera body 5, and the film 4 passes through a tunnel having a length $\lambda 3$ formed between an inner rail 5b of the camera body 5 and the pressure plate 1.

The film 4 has a thickness $\lambda 4$ which is smaller than $\lambda 3$ ($\lambda 3 > \lambda 4$). Normally, $\lambda 3 = 0.21$ mm and $\lambda 4$ is 0.14 mm and a difference therebetween is only 0.07 mm. Accordingly, if the magnetic head 2 projects from the pressure plate 1 even a bit, the film 4 jams between the camera body 5 and the magnetic head 2. As a result, the film feeding is slowed or the planarity is deteriorated. In the present embodiment, as described above, the film contact plane 2a of the magnetic head 2 does not project from the film contact plane 1b of the pressure plate 1, that is, they are coplanar. The term coplanar herein used includes tolerance of around 0.01 mm because the contact plane may slightly project because of tolerance.

The pad 3 serves to urge the film 4 to the magnetic head 2 as described above, because the information is not exactly read or written unless the magnetic head 2 is closely contacted to a magnetic layer (not shown) on the film 4. The urging to the film 4 by the pad 3 is done by the pad driving plunger 6. In a photographing mode, the pad 3 is retracted from the plane of the film 4 in order to maintain the planarity of the film 4.

A relationship between the pad 3 and the bevelings 1a of the pressure plate 1 on which the magnetic head 2 is mounted is explained with reference to FIG. 3. A length $\lambda 6$ of the bevelings 1a including the aperture serving as the notch for fixing the magnetic head 2 is larger than a length $\lambda 5$ of the pad 3 along the film feed direction ($\lambda 5 < \lambda 6$), and the bevelings 1a are formed over the entire periphery of the magnetic head 2. In other words, the area of the urging plane of the pad 3 is smaller than the area of the bevelings 1a including the aperture so that the film 4 is urged by the pad 3 in the area of the bevelings 1a. Accordingly, the film 4 is not caught by the pressure plate 1 and the information is written and read without error.

In FIG. 4, the film 4 has been fed from the position of FIG. 3 and the film 4 is urged to the magnetic head 2 by the pad 3. The film 4 is gently deformed along the curved surface (R surface) of the magnetic head 2 by the bevelings 1a. The pad 3 is also deformed because it is made of an elastic material so that the writing and reading of the information are assured.

Figure 5:
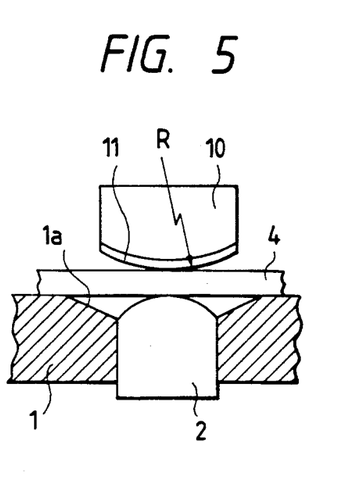
FIG. 5 shows a sectional view of a pressure plate and a magnetic head in a second embodiment of the present invention.

FIG. 5 shows a sectional view of a major portion of a second embodiment of the present invention.

In a pad 10 of the present embodiment, a teflon sheet 11 is bonded to make the contact plane of the film 4 smooth, and that area has a rounded shape (R surface). As a result, the film 4 is not caught by the pad 10 or damaged thereby.

Figure 6:
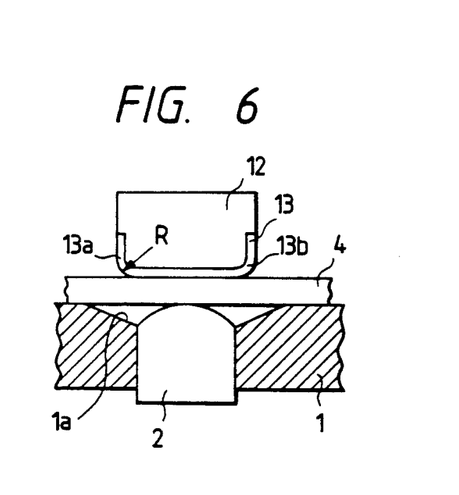
FIG. 6 shows a pressure plate, a magnetic head and a pad in a third embodiment of the present invention.

FIG. 6 shows a sectional view of a major portion in a third embodiment of the present invention. Like in the second embodiment, a teflon sheet 13 is bonded to a pad 12 to smoothen the contact plane of the film 4 and corners 13a and 13b are rounded. As a result, the film 4 is not caught by the pad 12 or damaged thereby.

Figures 7, 8:
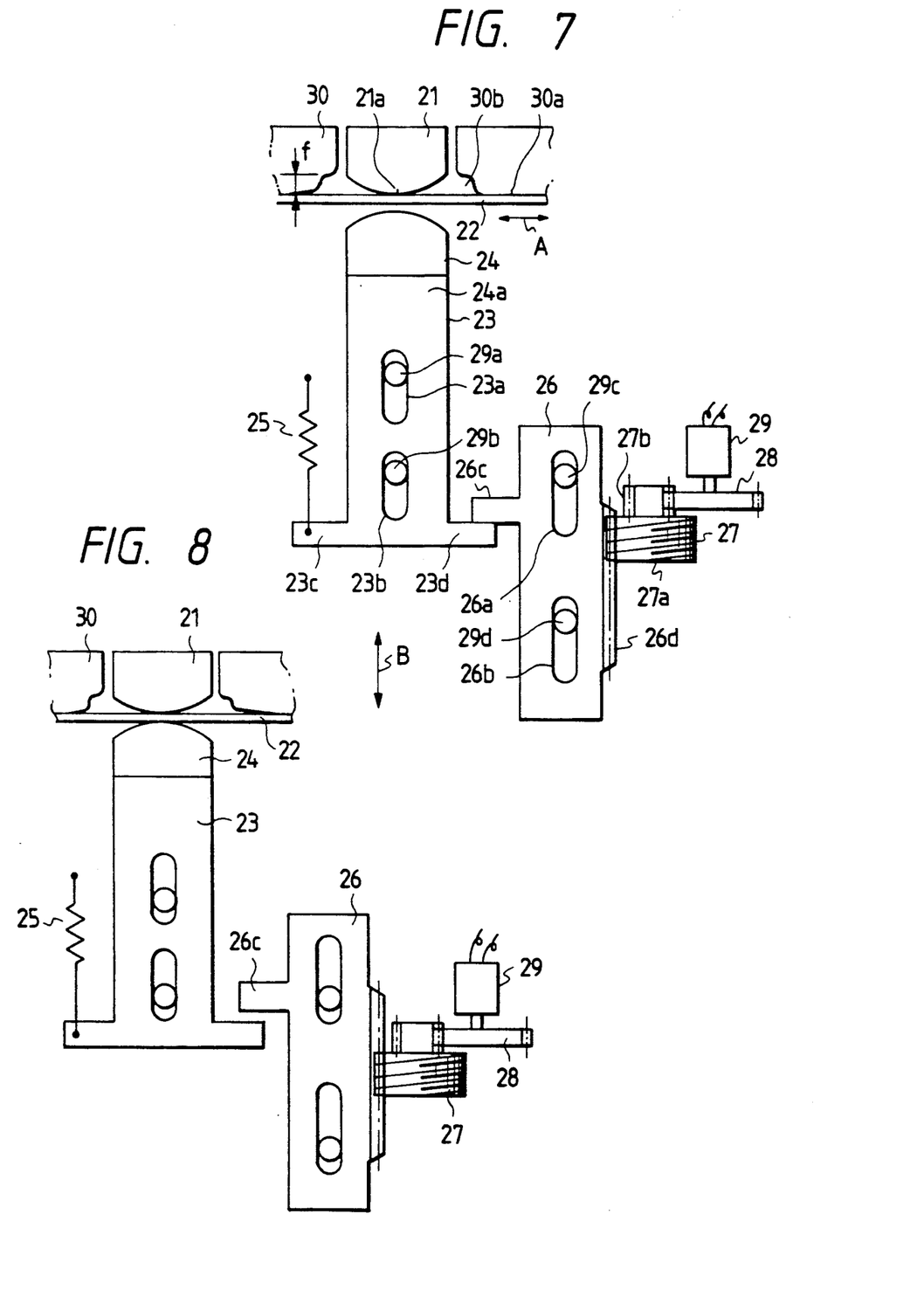
FIG. 7 shows a plan view of a mechanical configuration when the magnetic head is not actuated in the fourth embodiment of the present invention.
FIG. 8 shows a plan view of a mechanic configuration when the magnetic head is actuated.
Figure 9:
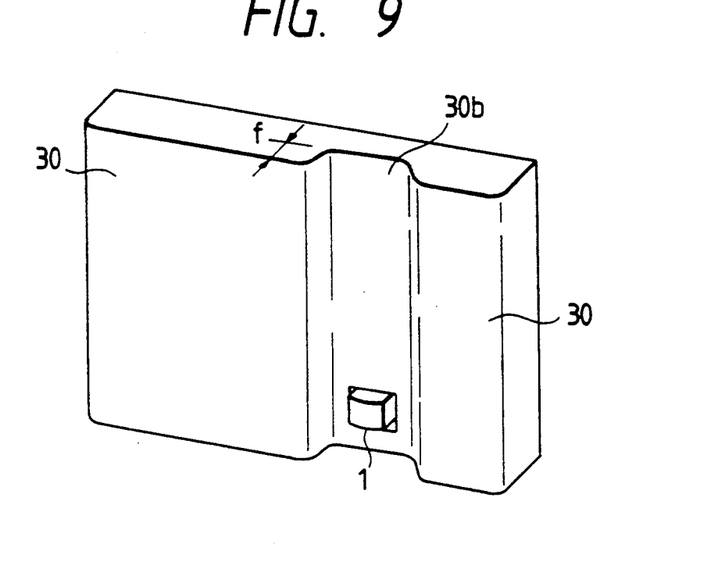
FIG. 9 shows a perspective view of the pressure plate and the magnetic head of FIG. 7.

FIGS. 7 to 9 show a fourth embodiment of the present invention. Numeral 21 denotes a magnetic head having a magnetic gap 21a. It writes information to a magnetic memory of a film 22 which runs along an arrow A, and reads the information from the magnetic memory. Numeral 23 denotes an urging lever slidable along an arrow B and having slots 23a and 23b fitted to projections 29a and 29b formed on a base plate (not shown). Numeral 24 denotes a pad which serves as a film urging member mounted on the urging lever 23. Numeral 25 denotes a spring having one end thereof attached to the base plate (not shown) and the other end thereof attached to a spring hook 23c of the urging lever 23. It biases the urging lever 23 upward in FIG. 7.

Numeral 26 denotes a rack lever slidable along the arrow B and having slots 26a and 26b fitted to projections 29c and 29d of the base plate. An arm 26c of the rack lever 26 can engage with an arm 23d of the urging lever 23. Numeral 27 denotes a worm member rotatably mounted on the base plate and comprises a worm wheel 27a which meshes with a rack 26d of the rack lever 26 and a gear 27b. Numeral 28 denotes a spur gear which meshes with the gear 27b of the worm member 27. It is fixed to a rotary shaft of a pad drive motor 29 mounted on the base plate.

Numeral 30 denotes a pressure plate similar to that in the previous embodiment. As shown in FIGS. 7 and 9, a groove 30b which is retracted by depth f from a film contact plane 30a to which the film 22 contacts and which forms a gentle notch to the pressure plate 30 is formed perpendicularly to the direction of film transport. The magnetic head 21 is mounted at a position in the groove 30b though which the magnetic memory of the film 22 passes. The magnetic head 21 is mounted such that the leading edge (magnetic gap 21a) is coplanar with the film contact plane 30a or slightly retracted.

The pad drive motor 29 can be rotated either forward or backward. In the forward rotation, the rack lever 26 is moved upward in FIG. 1, and in the backward rotation, it is moved downward.

FIG. 7 shows positional relationship of the members when the magnetic head 21 is not actuated. Since the arm 26c of the rack lever 26 engages with the arm 23b of the urging lever 23, the upward movement of the urging lever 23 in FIG. 7 is restricted. Accordingly, the film 22 does not contact to the pad 24 and the planarity of the film 22 is not affected.

The exposure to the film 22 is usually done in this state.

FIG. 8 shows positional relationship of the members when the information is written or read to or from the magnetic memory (not shown) of the film 22 by the magnetic head 21. The position of FIG. 8 is attained by forwardly driving the pad drive motor 29 from the position of FIG. 7. As the pad drive motor 29 is forwardly driven, the rack lever 26 is moved upward in FIG. 7 through the worm member 27. As a result, the urging lever 23 is released from the position restriction by the rack lever 26 and is moved upward by the biasing force of the spring 25 and stops while the pad 24 at the leading edge urges the film 22 to the magnetic head 21. Then, the pad drive motor 29 is deenergized by a switch which is linked to the movement of the rack lever 26 so that the motor 29 stops and the rack lever 26 also stops.

At the position, the film 22 is correctly urged to the magnetic head 21 so that the information is correctly written or read. When the information is written or read, the film 22 is fed along the direction A of FIG. 7.

When the information has been written or read, the pad drive motor 29 is reversely energized. As a result, the motor 29 is reversely rotated and the rack lever 26 starts to move downward in FIG. 8, and the arm 26c of the rack lever 26 engages with the arm 23d of the urging lever 23. Thus, the urging lever 23 also starts to move downward against the biasing force of the spring 25. As a result, the pad 24 moves away from the film plane 22. Then, the pad drive motor 29 is deenergized by a switch which detects an initial position of the pad 24 or the control to the energization time of the pad drive motor 29 and the members are reset to the positions shown in FIG. 7.

Figure 10:
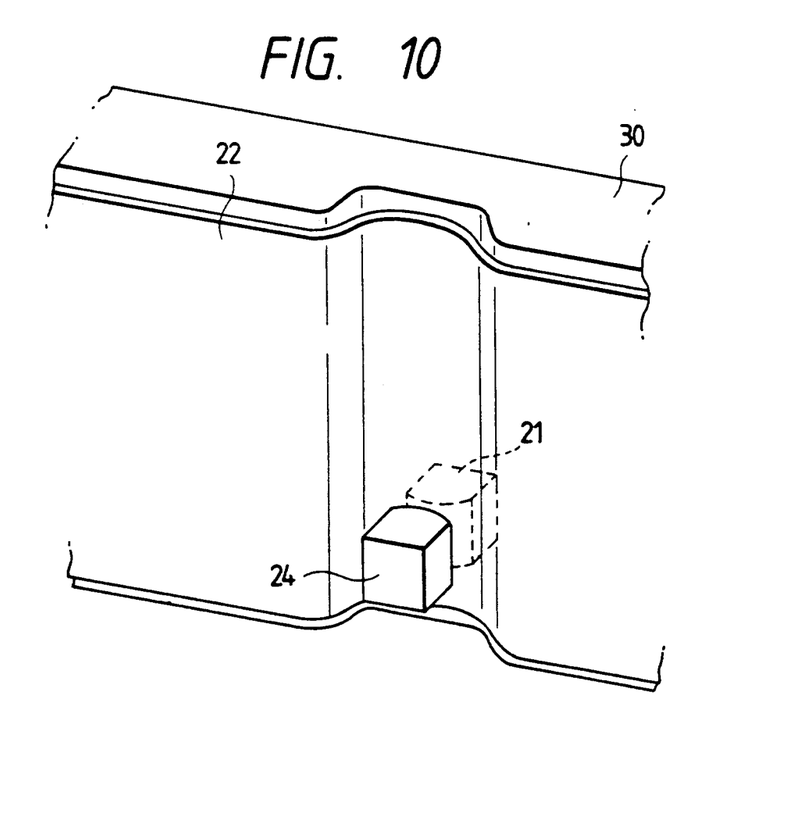
FIG. 10 shows a perspective view illustrating flexion to a film to the pressure plate of FIG. 9.

As described above, the pressure plate 30 has the groove 30b having the depth f which extends through the mount area of the magnetic head 21 from the upper end to the lower end of the pressure plate 30. For example, even if the leading edge of the magnetic head 21 is mounted at a substantially retracted position relative to the coplanar or slightly retracted position with respect to the film contact plane 30a, it will not happen that the film 22 is not sufficiently flexed by the restriction of the insertion aperture for the magnetic head of the pressure plate when the film 22 is urged to the pad 24, if a distance d from the film contact plane 30a of the pressure plate 30 to the leading edge of the magnetic head 21 is smaller than f (d<f), because the film 22 is easily flexed over the entire width along the groove 30b as shown in FIG. 10 and the magnetic memory of the film 22 is properly pressed to the magnetic head 21.

The direction of the groove formed in the pressure plate is not limited to the perpendicular direction to the direction of the film transport but it may be in the same direction as the direction of the film transport, passing through the mount area of the magnetic head 21. This is shown in FIG. 11.

Figure 11:
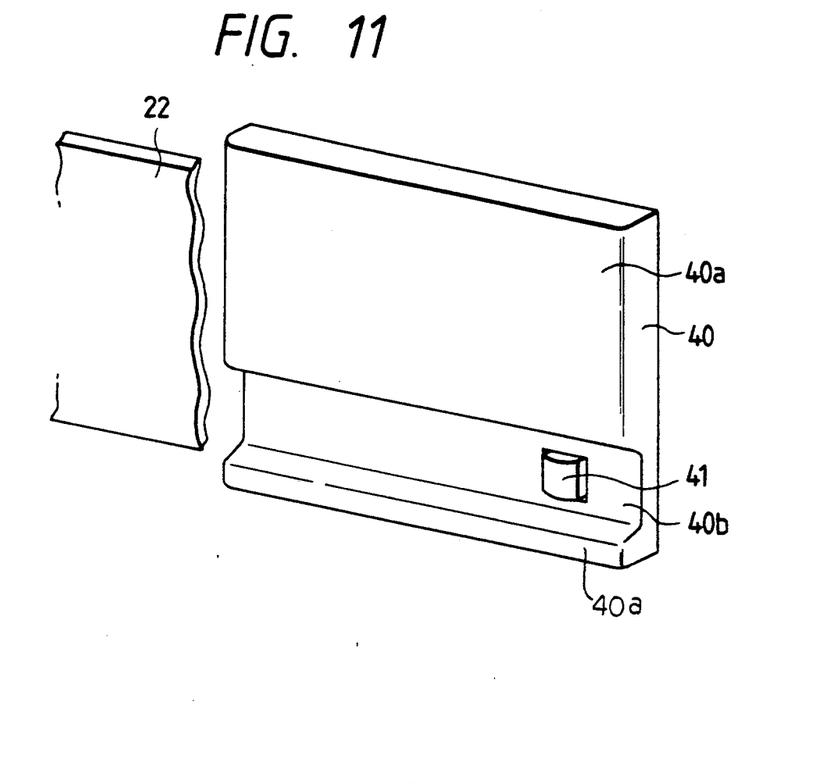
FIG. 11 shows a perspective view of a pressure plate in a fifth embodiment of the present invention.

In FIG. 11, numeral 40 denotes a pressure plate. A groove 40b is formed to extend in the same direction as the direction of the transport of the film 22. Numeral 41 denotes a magnetic head and numeral 40a denotes a film contact plane thereof.

In accordance with the embodiments described above, the pressure plate around the magnetic head is gently ground (chamfered) and the area of the pressing plane of the pad is smaller than the area of the aperture to fix the magnetic head. Accordingly, in the position where the film is urged to the magnetic head by the pad, the film is not caught by the pressure plate but smoothly moved while it makes the close contact to the magnetic head. Thus, the film feed load does not increase, the film is not damaged and the information is written and read without failure. Further, since the magnetic head does not project from the pressure plate plane, the planarity of the film is not lost.

In the embodiments shown in FIGS. 5 and 6, the teflon sheet is bonded to the pad and the leading edge thereof is chamfered (rounded surface). Thus, the damage of the film by the pad is prevented.

In the embodiments of FIGS. 7 to 11, the linear groove is formed at the area of the pressure plate including the mount area of the magnetic head so that the film is easily deformed along the groove when it is urged by the film urging member. Accordingly, even if there is some mount error of the magnetic head, the contact between the magnetic memory of the film and the magnetic head is assured.

In the above embodiments, the film is urged by the pad within the area of bevelings, although it is only necessary that the force of the pad is applied within the area of the bevelings.

While the camera which uses the film with the magnetic memory is shown in the embodiments, the present invention is equally applicable to a camera which uses a film with other storage medium and means for writing or reading information to or from the storage medium.

We claim:

1. A camera using a film with a magnetic memory comprising:
   (A) a magnetic head for writing information to or reading information from the magnetic memory of the film; and
   (B) restriction means for holding said magnetic head and assuring the planarity of the film;
   said restriction means having a notch gently formed to said restriction means at an area to hold said magnetic head.

2. A camera according to claim 1 wherein said restriction means includes a pressure plate.

3. A camera according to claim 1 wherein said notch includes a beveling.

4. A camera according to claim 1 wherein said restriction means holds said magnetic head such that a leading edge of said magnetic head is substantially coplanar with a film contact plane of said restriction means.

5. A camera according to claim 1 wherein said notch includes a linear groove.

6. A camera according to claim 5 wherein said linear groove is perpendicular to the direction of film transport.

7. A camera according to claim 5 wherein said linear groove is along the direction of film transport.

8. A camera according to claim 1 further comprising:
   urging means for urging the magnetic memory of the film to said magnetic head,
   said urging means urging the magnetic memory of the film to rail magnetic head within the area of said notch.

9. A camera according to claim 8 wherein said urging means has a curved urging plane.

10. A camera according to claim 8 wherein said urging means has curved planes at edges of an urging plane.

11. A camera according to claim 8 wherein said urging means has a slipping member on a film contact plane thereof to smooth the contact with the film.

12. A camera according to claim 11 wherein said slipping member includes a teflon sheet.

13. A camera according to claim 8 wherein said restriction means holds said magnetic head such that a leading edge of said magnetic head is substantially coplanar with a film contact plane of said restriction means.

14. A camera according to claim 8 wherein said notch includes a linear groove.

15. A camera according to claim 14 wherein said linear groove is perpendicular to the direction of film transport.

16. A camera according to claim 14 wherein said linear groove is along the direction of film transport.

* * * * *

UNITED STATES PATENT AND TRADEMARK OFFICE
CERTIFICATE OF CORRECTION

PATENT NO. : 5,097,278
DATED : March 17, 1992
INVENTOR(S) : HIDEO TAMAMURA, ET AL.

It is certified that error appears in the above-identified patent and that said Letters Patent is hereby corrected as shown below:

<u>COLUMN 1</u>

Line 67, "mechanic" should read --mechanical--.

<u>COLUMN 2</u>

Line 4, "to" (first occurrence) should read --of--.

Line 37, "length $\lambda3$" should read --length 13--

Line 39, thickness $\lambda4$" should read --thickness 14-- and "$\lambda3$" should read --13--.

Line 40, "($\lambda3 > \lambda4$)." should read --(13 > 14).-- and "$\lambda3 = 0.21$ mm and $\lambda4$" should read --13 = 0.21 mm and 14--.

Line 63, "$\lambda6$" should read --16--.

Line 65, "length $\lambda5$" should read --length 15--.

Line 66, "($\lambda5 < \lambda6$)," should read --(15 < 16),--.

UNITED STATES PATENT AND TRADEMARK OFFICE
CERTIFICATE OF CORRECTION

PATENT NO. : 5,097,278

DATED : March 17, 1992

INVENTOR(S) : HIDEO TAMAMURA, ET AL.

It is certified that error appears in the above-identified patent and that said Letters Patent is hereby corrected as shown below:

COLUMN 4

Line 22, "the position," should read --this position,--.

COLUMN 6

Line 21, "rail" should read --said--.

Signed and Sealed this

Third Day of August, 1993

Attest:

MICHAEL K. KIRK

Attesting Officer

Acting Commissioner of Patents and Trademarks